June 13, 1933.　　　S. PLAYER ET AL　　　1,913,854
CRANK SHAFT LAPPING MACHINE
Filed Sept. 12, 1929　　2 Sheets-Sheet 1

Witnesses

Inventors
Sydney Player
AND
Herbert S. Indge
ATTORNEY

June 13, 1933.  S. PLAYER ET AL  1,913,854
CRANK SHAFT LAPPING MACHINE
Filed Sept. 12, 1929   2 Sheets-Sheet 2
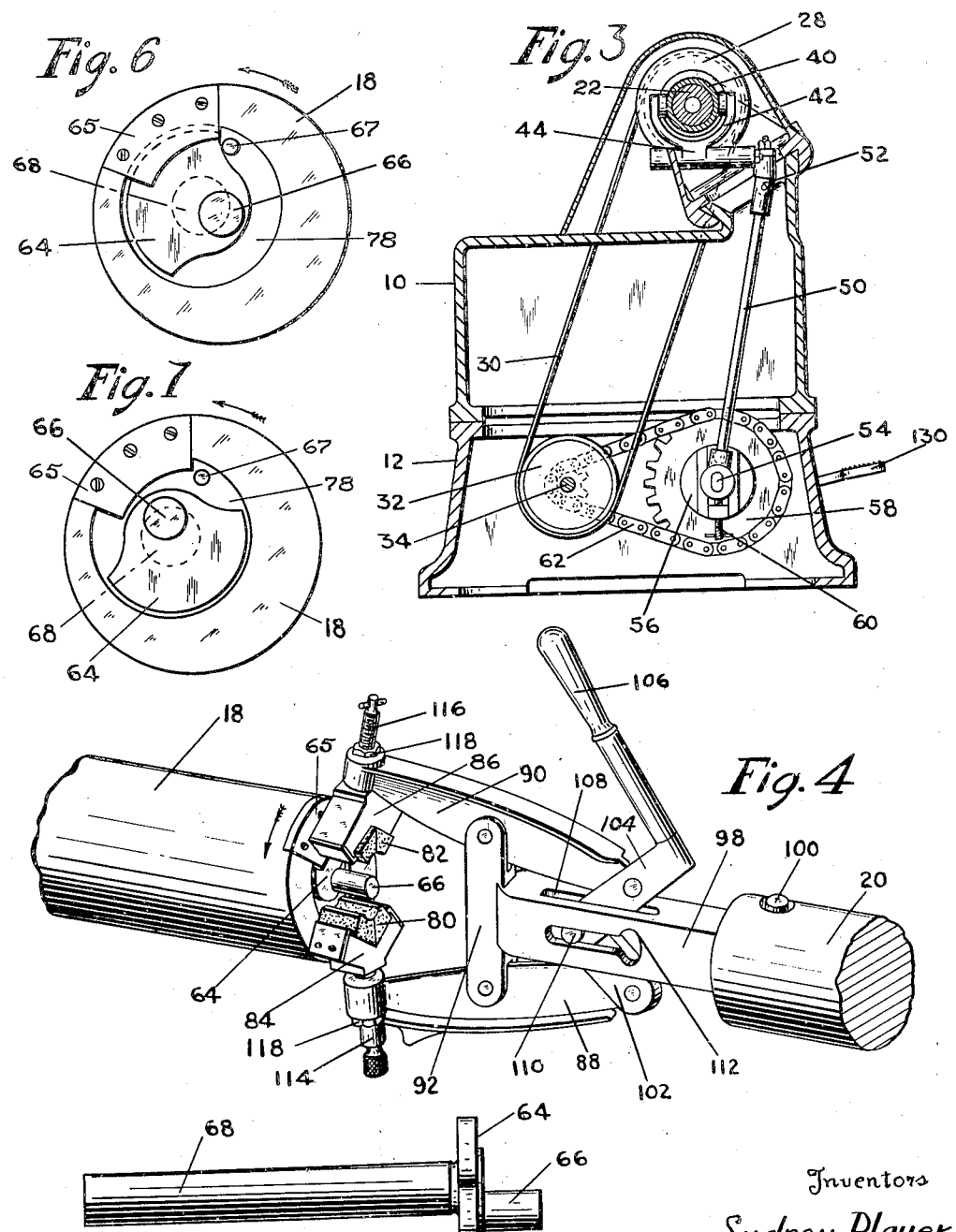
Inventors
Sydney Player
AND
Herbert S. Indge
Clayton L. Jenks
ATTORNEY Patented June 13, 1933

1,913,854

UNITED STATES PATENT OFFICE

SYDNEY PLAYER AND HERBERT S. INDGE, OF WESTBORO, MASSACHUSETTS, ASSIGNORS TO NORTON COMPANY, OF WORCESTER, MASSACHUSETTS, A CORPORATION OF MASSACHUSETTS

CRANK SHAFT LAPPING MACHINE

Application filed September 12, 1929. Serial No. 392,098.

This invention relates to machines for lapping work pieces having parts which are of different diameters or which are unsymmetrically arranged. An important field of use for such a machine is in lapping crank pins in work pieces which comprise an integral crank and crank shaft. The machines which are commonly employed for lapping small cylindrical pieces such as roller bearings, are not well adapted to handle such work pieces and the same is true of machines organized for supporting upon centers large pieces of work, like the crank shafts of automobiles.

This invention is particularly concerned with the problems of handling work pieces of irregular shape having projecting parts which it is desired to lap, and contemplates novel mechanism for holding and rotating such an irregular work piece about the axis of the part to be lapped and novel mechanism for supporting lapping tools in position to operate upon the projecting part.

An important feature of the invention consists in mechanism for supporting a work piece by engagement with the body of the work so that the projecting part of pin to be lapped projects freely in the axis of rotation beyond the supporting mechanism and is accessible to lapping tools in an endwise direction.

Another feature of the invention consists in lap carrying mechanism which is disposed in the plane of the axis of rotation of the pin to be lapped and is capable of movement away from the work in the direction of the axis of said work. Preferably and as herein illustrated, a lap carrying arm is pivotally mounted for movement about an upright axis so that it may be swung away from the operator after having been disengaged from the work to facilitate the withdrawal of a finished piece of work and the insertion of a new piece.

A further feature of the invention consists in the provision of a mechanism for resiliently urging the lap holder toward the work in a direction parallel with the work axis during the lapping operation and another mechanism controlled by the operator for withdrawing said lap holder away from said work in opposition to the movement of said resilient mechanism to facilitate swinging of the lap holder.

These and other features of the invention will be best understood and appreciated from the following description of a preferred embodiment thereof, selected for purposes of illustration and shown in the accompanying drawings, in which Fig. 1 is a view in longitudinal vertical section of a lapping machine embodying the invention;

Fig. 3 is a view in transverse vertical section through the driving spindle and the base of the machine, illustrating the mechanism for rotating and oscillating the spindle;

Fig. 4 is a view in perspective, on an enlarged scale, of a work piece supported in the work holder, and the lap carrying members;

Fig. 5 is a view in side elevation of a typical work piece; and

Figs. 6 and 7 are end views showing the work piece positioned in its holder.

Figures 1, 2:
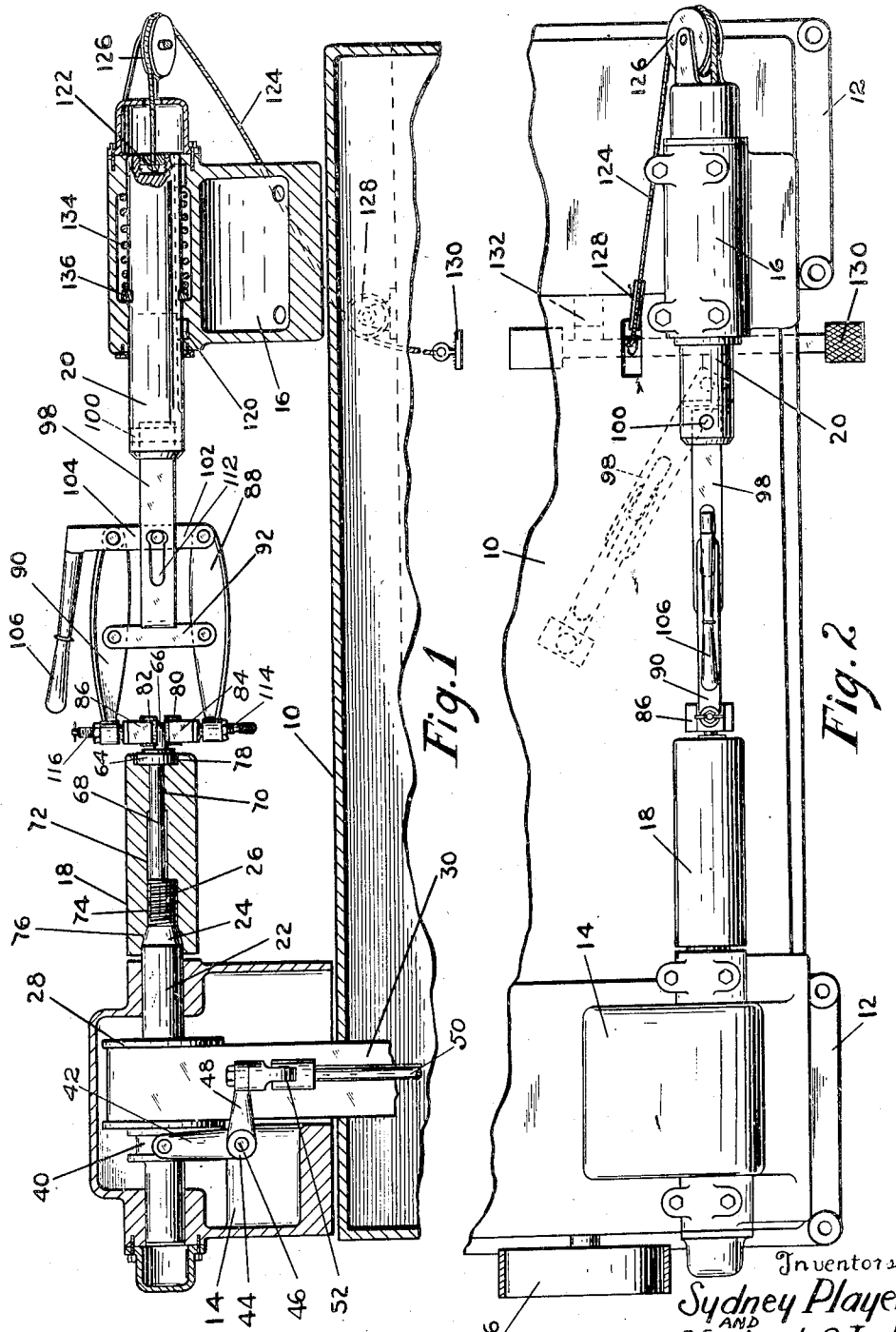
Fig. 2 is a corresponding plan view.

The machine illustrated is of the general type of that shown in Letters Patent of the United States No. 1,711,061, granted April 30, 1929, upon the application of Sydney Player, to which patent reference may be had for details of construction not herein set forth.

The machine comprises a frame or bed 10 supported at its opposite ends upon bases 12, one of which is shown in Fig. 3, and serving to support a headstock 14 and a tailstock 16, the first of which carries a work holder 18, while the tailstock provides a support for a plunger 20 on which are mounted the operating tools.

In the headstock 14 there is journaled a spindle 22 rotatably and slidably mounted therein, said spindle having a tapered shoulder 24 and a threaded portion 26 shaped to fit the work holder 18, as will be later described. Fast on the spindle is a pulley 28 driven by a belt 30 which passes over another pulley 32 on a drive shaft 34 rotated by a pulley 36 for driving the machine. Mechanism is also provided, as shown in Figs. 1 and 3, for oscillating the spindle axially. This comprises a grooved collar 40 on the spindle with which there are engaged the forked ends of one of the arms 42 of a bell crank lever 44 pivoted at 46 in the headstock 14 and provided with an arm 48 connected to a vertical operating rod 50 through a swivel coupling 52. The lower end of the operating rod 50 is connected to an adjustable crank pin 54 slidable in a groove formed in a crank disk 56 attached to a sprocket 58, said crank pin being adjustable along said groove by means of a screw 60 to control the throw of the crank and hence the amount which the work carrying spindle 22 is oscillated along its axis. A chain 62 connects the sprocket 58 and a smaller sprocket on the drive shaft 34 so that when power is supplied to the machine the spindle 22 will be rapidly rotated and at the same time given a longitudinal oscillation.

The machine, as herein illustrated, is especially designed so that the work holder 18 will receive one typical form of work piece which may consist of a crank shaft 68 having a counterbalanced crank disk 64 and a projecting crank pin 66 arranged eccentrically with respect to the crank shaft 68. It is desired to lap the cylindrical surface of the crank pin 66 so as to make it perfect in shape and surface polish. When the work piece to be treated is relatively small, as in the present case, the holder 18 is provided with a bore 70 to receive the crank shaft 68, said bore being enlarged slightly at 72 and still further enlarged and threaded at 74. Beyond the threaded portion 74 is a tapered portion 76 adapted to be brought into engagement with the tapered shoulder 24 on the spindle when the work holder is tightly clamped. It will be noted also that the work holder has a recess 78 in its end to receive the body of the crank disk 64, said recess occupying such a position with respect to the bore 70 which receives the crank shaft 68 that the crank pin 66 may be positioned accurately in alignment with the axis of the work holder 18 and the spindle 22.

The recess 78 is of sufficient depth to completely receive the crank disk 64 and the holder is provided with a segment plate 65 constituting an overhanging flange arranged to engage the outer face of the crank disk 64 when the latter is in operative position and to retain the work piece in the holder against endwise movement. The angular position of the work piece is determined by driving pin 67 set in the holder and projecting into the recess 78 in position to engage the periphery of the crank disk 64 at a predetermined point. In this way the crank pin 66 is positioned to be rotated about its own axis and to run true in the axis of the spindle.

As a consequence of this arrangement, the laps may be mounted substantially rigidly and non-rotatably by mechanism supported on the plunger 20 of the tailstock 16. The laps 80, 82 may be arcuate blocks of cast iron and provided with a suitable lapping compound mixed with oil or they may be constructed of blocks of abrasive grains suitably bonded with vitrified ceramic material. The laps 80, 82 are mounted in carrier blocks 84, 86 which are supported at the outer ends of rigid lap tool holding members 88, 90. The lap holding members are mounted for movement towards the work axis in order that the laps 80, 82 may operatively engage the sides of the pin 66 or be withdrawn therefrom to an inoperative position. These levers are pivotally mounted in slots in the outer ends of a cross head 92 forming a part of a supporting holder or carrier arm 98 which in turn is pivotally mounted in the plunger 20 to swing about a vertical pin 100. The plunger 20 is slidable along an axis coincident with or parallel to the axis of rotation of the work holder. A slot open at the rear side is provided in the plunger 20 for the reception of this arm 98 so that it may be swung to the rear, as shown in dotted lines in Fig. 2, or brought into line with the axis of the crank pin 66. In order to provide for separating laps or bringing them together into engagement with the work, toggle links 102, 104 are pivotally connected to the rear ends of the levers 88, 90, the toggle link 104 having an operating handle 106. These toggle links extend through a vertical slot 108 in the carrier arm 98 and their central pivot 110 extends laterally into slots 112 in the sides of the carrier arm so as to permit the toggle pin 110 to move forward when the toggle is collapsed or to be moved to the rear to a position where the toggle is maintained in straightened relation when the laps 80, 82 are in engagement with the work. The rear end of the slot 112 is slightly enlarged so that the laps may be brought into tight engagement with the work, any unbalanced strain on either lap being relieved by bodily vertical movement of the links in straightened condition. The carrier blocks 84, 86 for the laps are secured to the ends of threaded bolts 114 and 116 by means of which the respective laps may be adjusted into exactly the desired relation to the work and then locked in position by lock nuts 118. Either one or both of the carrier blocks 84, 86 may be swiveled upon its respective bolt if desired, as shown in my prior Patent No. 1,711,061, above mentioned.

The plunger 20 is provided with a keyway for engagement with suitable keys 120 in the tailstock 16 so that it can slide therein without being rotated, and at its rear end it is provided with a perforated plug 122 for the attachment of a cord 124 passing over pulleys 126 and 128 and attached at its lower end to a treadle 130. This treadle is pivoted at 132 upon the base and enables the operator to move the plunger 20 to the right to withdraw the lap carriers endwise from operative position so that the carrier arm 98 may be swung to the rear, as illustrated in Fig. 2.

Within the tailstock 16 there is provided a recess for the reception of a spring 134 which surrounds the plunger 20 and bears against a collar 136 upon said plunger, thus tending to urge the plunger 20 to the left to a limit determined by the engagement of the collar 136 with the inner face of the bearing. The laps are thus yieldingly and resiliently maintained in operative position but are permitted to move axially to the right in case of accidental engagement of the crank disk 64 with the laps during axial oscillation of the spindle 22 to withdraw the plunger 20 and the laps 80, 82 away from the pin 66 in opposition to the spring 134.

In operating the machine above described it may be assumed that the carrier arm 98 is in the dotted line position shown in Fig. 2. A work piece will be inserted in the work holder 18 and positioned beneath the flange plate 65 with the periphery of the crank disk 64 against the driving pin 67. The operator will then grasp the handle 106 to break the toggle and open the lap carrying levers, and swing the carrier arm 98 into alignment with the crank pin 66, operating the handle 106 to straighten the toggle and bring the laps 80, 82 into firm engagement with opposite sides of the crank pin. He will then release the lever and start the machine in operation. The lapping operation is then effected by the relative rotation and endwise oscillation between the crank pin 66 and the laps.

Having thus described my invention, what I claim as new and desire to secure by Letters Patent of the United States is:

1. In a lapping machine, means for rotatably supporting a work piece, a holder for a pair of non-rotatable laps adapted to be applied to opposite sides of said work or withdrawn therefrom, and means for pivotally supporting said holder for swinging movement about an axis transverse to the axis of the work so that said lap holder may be swung aside to allow space for insertion and withdrawal of the piece of work.

2. In a lapping machine, a holder for a crank piece having a projecting crank pin, said holder being constructed and arranged to rotate said crank pin around its own axis and to oscillate it axially, a carrier for a pair of opposed arcuate laps extending in the general direction of the axis of the pin away from the pin, a slidable plunger mounted for movement in a direction parallel to the axis of the pin, and a pivotal connection between said plunger and said lap carrier constructed and arranged to allow swinging movement of the laps about an axis transverse to the axis of the pin.

3. In a lapping machine, a rotatable work holder constructed and arranged to support a work piece having a projecting pin with the pin disposed coaxially with the work holder and projecting freely beyond the work holder, means to rotate and oscillate said work holder, a holder for laps adapted to be brought into engagement with opposite sides of said projecting pin mounted for swinging movement around an upright axis, and means to limit the swinging movement in one direction.

4. In a lapping machine, a rotatable work holder constructed and arranged to support a work piece having a projecting pin with the pin disclosed coaxially with the work holder and projecting freely beyond the work holder, means to rotate and oscillate said work holder, a plunger slidable along an axis parallel to the axis of rotation of the work holder, and a lap carrier pivotally mounted on said plunger for swinging movement about an axis transverse to the axis of the plunger to get the laps out of the way when it is desired to replace a work piece.

5. In a lapping machine, a rotatable work holder constructed and arranged to support a work piece having a projecting pin with the pin disposed coaxially with the work holder and projecting freely beyond the work holder, means to rotate and oscillate said work holder, a plunger slidable along an axis parallel to the axis of rotation of the work holder, a lap carrier pivotally mounted on said plunger for swinging movement about an axis transverse to the axis of the plunger to get the laps out of the way when it is desired to replace the work piece, resilient means urging said plunger in one direction, and manually operable means to withdraw the plunger and the laps in opposition to said resilient means.

6. In a lapping machine, a rotatable work holder constructed and arranged to support a work piece having a projecting pin with the pin disposed coaxially with the work holder and projecting freely beyond the work holder, means to rotate and oscillate said work holder, a pair of arcuate laps adapted to be brought into engagement with the sides of the pin, levers for supporting said laps movable in a plane containing the axis of the pin, means for swinging said levers to bring said laps into firm engagement with the pin, and a swinging support for said lap carrying levers arranged to allow the laps to be swung out of the way of the work when they have been disengaged therefrom.

7. A lapping machine comprising a rotatable work holder constructed and arranged to support a work piece having a projecting pin with the pin disposed coaxially with the work holder and projecting freely beyond the work holder, means to rotate and oscillate said work holder, a holder for a pair of non-rotatable lap jaws adapted to be brought into engagement with the opposed sides of the pin, a support for the holder mounted for movement in a longitudinal plane containing the axis of the pin, means for manually withdrawing said support and lap holder in a direction parallel to the axis of said pin, and means for pivotally mounting said holder on the support to allow swinging movement of the laps about an axis transverse to the axis of the pin to a sufficient extent for removal of the work.

8. In a lapping machine, a rotatable work holder constructed and arranged to support a work piece having a projecting pin with the pin projecting freely beyond the work holder and disposed coaxially with the work holder, means to rotate and oscillate said work holder, a pair of arcuate laps adapted to be brought into engagement with the sides of the pin, a holder including levers for supporting said laps mounted for movement in a plane containing the axis of the pin, means for swinging said levers to bring said laps into firm engagement with the pin, means controlled by the operator for withdrawing said lap carrying parts in a direction parallel to the axis of said pin, and means for pivotally mounting said holder to allow swinging movement of the laps about an axis transverse to the axis of the pin.

9. A machine for lapping the external surface of round work pieces comprising a base, means thereon for rotating the work, a lap having a surface engageable with the work during the lapping operation, a lap holder, means for oscillating the work and the lap holder relatively and parallel with the work axis, means for moving the lap towards and from the work and in a direction lying in an axial plane of the work, and means including a resilient mounting for one of said oscillating members which permits the work to overrun axially during said oscillation, whereby the lap may yield with the work movement without breakage.

10. A lapping machine comprising a rotatable work holder constructed and arranged to support a work piece having a projecting pin with the pin disposed coaxially with the work holder and projecting freely beyond the work holder, means to rotate and axially oscillate said work holder, a holder for a pair of opposed lap jaws adapted to be brought into engagement with the sides of the pin and extending in a direction which lies in an axial plane of the pin, said holder being immovable during a normal lapping operation, said lap holder being movable in a direction parallel to the axis of said pin, a spring serving to hold the lap forward in an operative lapping position which is so arranged that overrunning of the work will move the lap axially against the pressure of said spring, and means controlled by the operator to withdraw the holder and the laps from the pin in opposition to the action of said spring.

Signed at Worcester, Massachusetts, this 9th day of Sept. 1929.

SYDNEY PLAYER.
HERBERT S. INDGE.